(12) United States Patent
Bioret (10) Patent No.: US 11,745,458 B2
(45) Date of Patent: Sep. 5, 2023

(54) FLEXIBLE TUBULAR DEVICE COMPRISING A TUBULAR WALL WITH AN ELASTOMER MATRIX, REARING ENCLOSURE COMPRISING SUCH A DEVICE AND METHOD FOR MANUFACTURING THE LATTER

(71) Applicant: BIORET AGRI-LOGETTE CONFORT, Nort sur Erdre (FR)

(72) Inventor: Jean-Vincent Bioret, Petit Mars (FR)

(73) Assignee: BIORET AGRI-LOGETTE CONFORT, Nort sur Erdre (FR)

( * ) Notice: Subject to any disclaimer, the term of this patent is extended or adjusted under 35 U.S.C. 154(b) by 997 days.

(21) Appl. No.: 16/472,679

(22) PCT Filed: Dec. 20, 2017

(86) PCT No.: PCT/FR2017/053738
§ 371 (c)(1),
(2) Date: Jun. 21, 2019

(87) PCT Pub. No.: WO2018/115745
PCT Pub. Date: Jun. 28, 2018

(65) Prior Publication Data
US 2019/0366672 A1    Dec. 5, 2019

(30) Foreign Application Priority Data
Dec. 21, 2016   (FR) ...................................... 1663043

(51) Int. Cl.
*B32B 1/08*   (2006.01)
*B32B 3/04*   (2006.01)
(Continued)

(52) U.S. Cl.
CPC .............. *B32B 1/08* (2013.01); *A01K 1/0011* (2013.01); *B32B 3/04* (2013.01); *B32B 5/02* (2013.01);
(Continued)

(58) Field of Classification Search
CPC ................................ B32B 1/08; A01K 1/0011
See application file for complete search history.

(56) References Cited

U.S. PATENT DOCUMENTS 4,029,441 A  *  6/1977  Fischer ............... F04B 43/0072
                                                    417/478

FOREIGN PATENT DOCUMENTS

EP         595721 A1 *  5/1994  .......... F04B 43/0072
FR       2 268 959       11/1975
(Continued)

OTHER PUBLICATIONS

Boisseau, Machine Translation EP 595721 A1, 1994 (Year: 1994).*
International Search Report, PCT/FR2017/053738, dated Mar. 7, 2018.

*Primary Examiner* — Joshua J Michener
*Assistant Examiner* — Nicole Paige Maccrate
(74) *Attorney, Agent, or Firm* — NIXON & VANDERHYE (57) ABSTRACT

Disclosed is a flexible tubular device including a tubular wall that delimits a sealed chamber intended to be filled with a fluid. The tubular wall includes an elastomer matrix into which at least one reinforcement ply delimited by two longitudinal portions is incorporated. The at least one reinforcement ply has the general shape of a sleeve that extends inside the tubular wall to surround the sealed chamber; and the two longitudinal portions of the at least one reinforcement ply are juxtaposed relative to each other. Also disclosed is a rearing enclosure including such a device, and also a method for manufacturing the latter.

11 Claims, 3 Drawing Sheets

(51) Int. Cl.
*F16L 11/08* (2006.01)
*A01K 1/00* (2006.01)
*B32B 5/02* (2006.01)
*B32B 25/10* (2006.01)
*B32B 25/14* (2006.01)
*B32B 25/16* (2006.01)
*B32B 27/12* (2006.01)
*B32B 37/18* (2006.01)

(52) U.S. Cl.
CPC ............ *B32B 25/10* (2013.01); *B32B 25/14* (2013.01); *B32B 25/16* (2013.01); *B32B 27/12* (2013.01); *B32B 37/185* (2013.01); *F16L 11/08* (2013.01); *B32B 2262/0261* (2013.01); *B32B 2262/0276* (2013.01); *B32B 2262/062* (2013.01); *B32B 2262/103* (2013.01); *B32B 2274/00* (2013.01); *B32B 2307/5825* (2013.01); *B32B 2597/00* (2013.01)

(56) References Cited

FOREIGN PATENT DOCUMENTS

| | | | |
|---|---|---|---|
| GB | 2492219 A | * 12/2012 | ........... A01K 1/0005 |
| GB | 2 538 353 | 11/2016 | |
| JP | 1993-096691 A | 4/1993 | |
| JP | 2000-509601 A | 8/2000 | |
| WO | 03/031164 A1 | 4/2003 | |
| WO | WO 2011/162596 | 12/2011 | |

* cited by examiner

FLEXIBLE TUBULAR DEVICE COMPRISING A TUBULAR WALL WITH AN ELASTOMER MATRIX, REARING ENCLOSURE COMPRISING SUCH A DEVICE AND METHOD FOR MANUFACTURING THE LATTER

TECHNICAL FIELD TO WHICH THE INVENTION RELATES

The present invention generally relates to the field of the flexible tubular devices having a tubular wall with an elastomeric matrix that delimits a sealed chamber intended to be filled with a fluid.

It also relates to a livestock enclosure comprising at least one stall equipped with such a flexible tubular device to form a lower stop.

TECHNICAL BACK-GROUND

In certain technical fields, it may be interesting to implement flexible tubular devices that comprise a single-piece part having a tubular wall delimiting a sealed chamber intended to be filled with a fluid.

To combine strength and flexibility, the tubular wall comprises an elastomeric matrix into which are integrated reinforcement plies.

Such a flexible tubular device may for example equip a stall of a livestock enclosure to form a lower stop.

Indeed, in the field of livestock breeding, with the increasing time of presence of the animals indoor, the bedding comfort within stalls may become critical.

A lower stop or a neck bar are then two elements that allow the cow to be correctly positioned inside its stall.

The lower stop must not have sharp edges that could cause injuries to the animal's knees. Moreover, it must be high enough above the bedding.

Conventional systems such as straps provide a dissuasive screen, but animals used to them do not hesitate to push them and to loosen them; they hence lose their efficiency and need to be regularly re-tightened. Wood stops (rafters) are curative and stop effectively the animals, but harm their comfort and may cause some traumas upon impacts.

Lower stops are hence advantageously formed by flexible tubular devices as mentioned hereinabove.

This latter embodiment offers several advantages:
no trauma during the bedding,
adjustable height and stiffness (in particular according to the type of cow, of genetics, of stall, of mattress),
a natural lying position of the cow, often with a leg extended to the front of the stop, is favoured,
shock absorption.

But the present flexible tubular devices are not fully satisfying: the tubular wall suffers from tearing/breaking phenomena, causing a flowing of the fluid out of the sealed chamber.

For example, in the above-mentioned "lower stop" application, the breaking is caused by the repeated stresses generated by the animals.

There hence exists a need for flexible tubular devices that would have an increased strength to tearing/breaking phenomena.

OBJECT OF THE INVENTION

In order to remedy the above-mentioned drawback of the state of the art, the present invention proposes a new flexible tubular device with a new arrangement of said at least one reinforcement ply.

It has indeed been observed that the tearing/breaking phenomena came from an unsuitable arrangement of said at least one reinforcement ply in the current flexible tubular devices.

More particularly, it is proposed according to the invention a flexible tubular device comprising a single-piece part having a tubular wall that delimits a sealed chamber intended to be filled with a fluid; the tubular wall comprises an elastomeric matrix into which is integrated at least one reinforcement ply delimited by two longitudinal portions.

And according to the invention, said at least one reinforcement ply has the general shape of a sleeve that extends within said tubular wall to surround said sealed chamber; said two longitudinal portions of said at least one reinforcement ply are juxtaposed to each other.

In the present invention, said at least one reinforcement ply is continuous (or at least almost continuous) over the whole circumference of the tubular wall.

This arrangement provides a significant increase of the strength of the flexible tubular device, and hence a substantial reduction of the tearing/breaking phenomena met with the flexible tubular devices of the prior art.

Other non-limitative and advantageous characteristics of the flexible tubular device according to the invention, taken individually or according to any technically possible combination, are the following:

the single-piece part includes a radial longitudinal lip, longitudinally connected to said tubular wall; and the two longitudinal portions of said at least one reinforcement ply are superimposed to each other within said radial longitudinal lip; according to a particular embodiment, said tubular wall includes an inner elastomeric layer and an outer elastomeric layer, that sandwich said at least one reinforcement ply; and said radial longitudinal lip includes the two longitudinal portions of said at least one reinforcement ply that, on the one hand, sandwich a lateral portion of the inner elastomeric layer and, on the other hand, are sandwiched by two lateral portions of the outer elastomeric layer;

when empty, said flexible tubular device has the shape of a parallelepipedal strip having two superimposed parallelepipedal walls that delimit the sealed chamber and that are assembled at two lateral portions; said at least one reinforcement ply comprises, on the one hand, two main sections each extending over the width of one of the two parallelepipedal walls and, on the other hand, a junction section extending within a first one of said lateral portions; wherein said longitudinal portions of said at least one reinforcement ply extend within a second one of said lateral portions.

The invention also proposes a livestock enclosure comprising at least one stall delimited by:
two lateral partitions, for example tubular structures,
a stall rear sill, extending along a access corridor,
a front limit, forming the back of the stall,
wherein said front limit includes a flexible tubular device according to the invention to form a lower stop.

Preferably, said rear sill is also equipped with a flexible tubular device according to the invention.

Also preferably, said livestock enclosure comprises means for filling said at least one flexible tubular device.

Still preferably, said at least one flexible tubular device is fastened through fastening means added through its radial longitudinal lip.

The invention also relates to a method for manufacturing the flexible tubular device according to the invention, comprising:
(i) a step of superimposing at least two layers of elastomeric material between which is added at least one reinforcement ply, to form an intermediate strip,
(ii) a step of applying inter-layer means on a free surface of said intermediate strip, adapted to locally prevent said free surface from being attached, to form the sealed chamber,
(iii) a step of folding in half said intermediate strip, along a folding line corresponding to a median longitudinal axis of said intermediate strip, so as to sandwich said inter-layer means, and
(iv) a step of attaching together the surfaces in contact of said superimposed layers, to form said flexible tubular device.

DETAILED DESCRIPTION OF THE INVENTION

The invention will be further illustrated, without being limited in anyway, by the following description of particular embodiments in relation with the appended drawings, in which.

Figure 1:
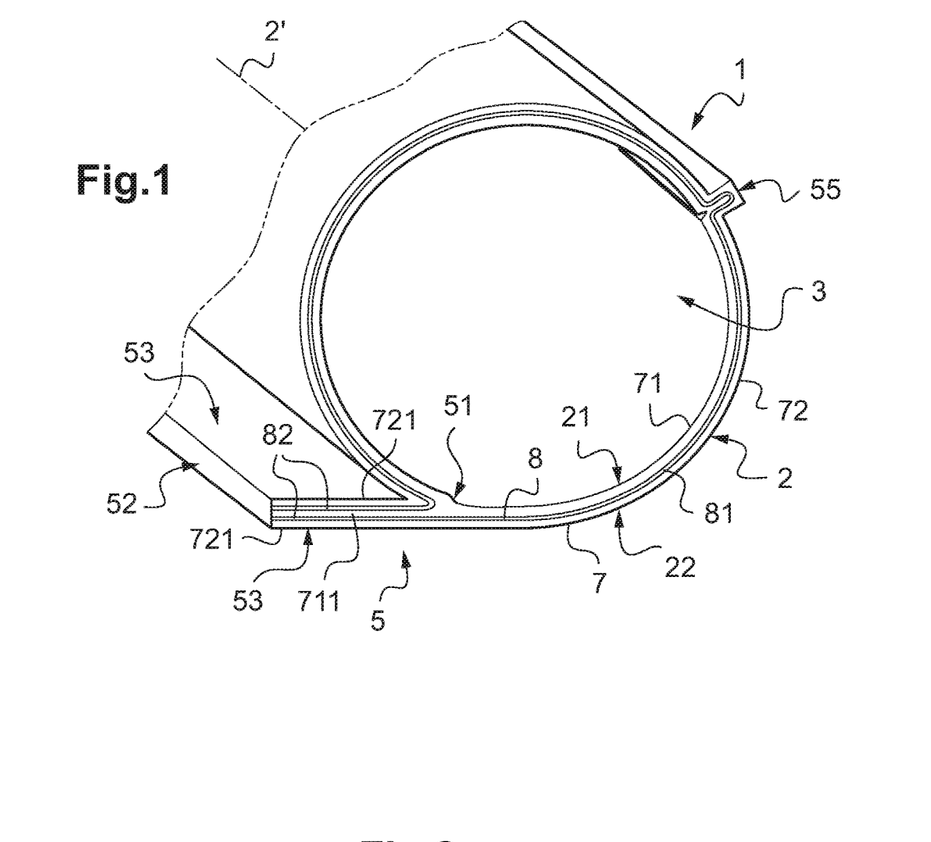
FIG. 1 is a schematic view, in perspective and with a cross-sectional plane, of a flexible tubular device according to the invention.

The flexible tubular device 1 is schematically shown, in isolation, in FIG. 1.

This flexible tubular device 1 consists in a single-piece part, in the general shape of a rod or a tube, which herein comprises two main portions:
a tubular wall 2 that delimits a sealed chamber 3 filled with a fluid, and
a radial longitudinal lip 5, longitudinally connected to the tubular wall 2 and advantageously extending over the whole length of the latter.

The tubular wall 2 is continuous (herein devoid of longitudinal opening); the radial longitudinal lip 5 is made integral with said tubular wall 2.

When the sealed chamber 3 is full, the tubular wall 2 is of generally cylindrical shape and has a longitudinal axis 2'.

This tubular wall 2 includes two opposite cylindrical surfaces:
an inner surface 21, which delimits the sealed chamber 3, and
an outer surface 22.

The distance between these two surfaces 21, 22 defines the thickness of the tubular wall 2.

Figure 4:
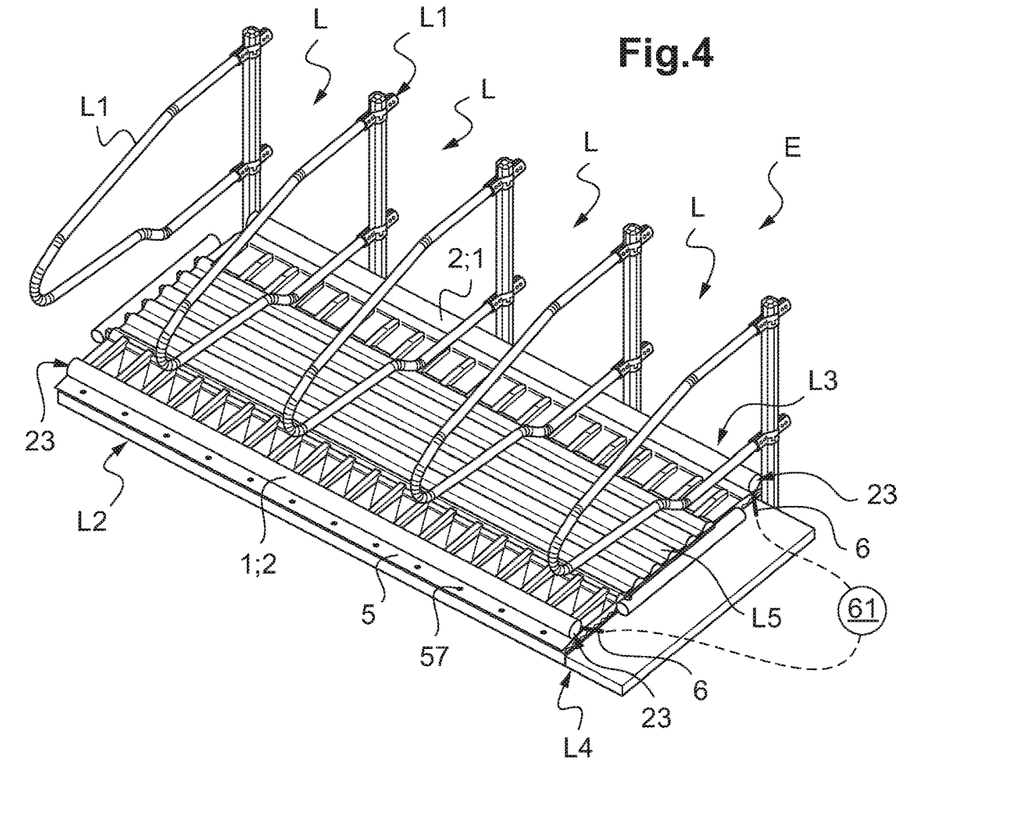
FIG. 4 is a schematic, perspective view of a series of stalls that is equipped with two flexible tubular devices according to the invention.

This tubular wall 2 also includes two ends 23 that are sealingly closed (see FIG. 4). The distance between these two ends 23 defines the length of the tubular wall 2.

For example, the tubular wall 2 has the following dimensional characteristics:
an inner surface 21 whose diameter is comprised between 150 and 400 mm,
a thickness comprised between 1.5 and 6 mm,
a length that is function of the transportable limit (weight, winding diameter, etc.).

By way of indication, the sealed chamber 3 is intended to be filled with a fluid, for example water, at a pressure comprise between 100 mbars and 2 bars.

The radial longitudinal lip 5 has the general shape of a parallelepipedal plate, that is laterally delimited by two longitudinal edges:
an inner edge 51, integrally connected to the tubular wall 2, and
a free, outer edge 52.

These longitudinal edges 51, 52 of the radial longitudinal lip 5 extend parallel to the longitudinal axis 2' of the tubular wall 2.

This radial longitudinal lip 5 also includes two opposite, rectangular surfaces 53, that each come in extension of the outer surface 22 of the tubular wall 2.

The distance between the two longitudinal edges 51, 52 defines the width of the radial longitudinal lip 5. The distance between the two opposite surfaces 53 defines the thickness of the radial longitudinal edge 5.

For example, the radial longitudinal lip 5 has the following dimensional characteristics:
a thickness comprised between 3 mm and 12 mm, and
a width comprised between 50 mm and 100 mm.

Diametrically opposed to the radial longitudinal lip 5, the tubular wall 2 herein includes a radial longitudinal rib 55.

The radial longitudinal rib 55 advantageously extends over the whole length of the tubular wall 2. This radial longitudinal rib 55 ensues from the manufacturing method described hereinafter.

The flexible tubular device 1 is made in an elastomeric matrix 7 within which at least one reinforcement ply 8 is integrated.

The elastomeric matrix 7 comprises at least one material adapted to undergo an elastic deformation, also called "elastic material", which is for example chosen among:
the elastomeric materials, i.e. for example the natural rubber, the "synthetic natural" rubber (or synthetic polyisoprene), the polybutadiene or the styrene-butadiene, or
the plastic materials or thermoplastic elastomers (TPE).

Said at least one reinforcement ply 8 is made of a material chosen for example among the textile fibres, the metal fibres or any other product providing stability or elongation strength.

Said at least one reinforcement ply 8 consists for example in a textile frame serving as a reinforcement, advantageously made of a material chosen among nylon, cotton, polyester, polyamide or any other reinforcement textile.

Generally, said at least one reinforcement ply 8 is arranged so as to provide an optimum strength to the flexible tubular device 1. It is in particular conformed to optimize the strength of the tubular wall 2 when the sealed chamber 3 thereof is full of fluid.

For the purpose, the flexible tubular device 1 includes a reinforcement ply 8 herein having two portions:
a main portion 81, which has the general shape of a sleeve and which extends within the tubular wall 2, to surround the sealed chamber 3, and
two longitudinal portions 82, that are juxtaposed to each other (herein within the radial longitudinal lip 5).

In other words, the main portion 81 has, in cross-sectional view, the general shape of a loop, continuous or almost continuous, which is closed over itself.

The main portion 81 hence gives to the sealed chamber 3 its form and strength.

This main portion 81 herein extends continuously within the radial longitudinal rib 55, in the form of an extension (for example, in the form of a U open towards the sealed chamber 3).

It will be noted that this particular configuration of the main portion 81, continuous on either side of the radial longitudinal lip 5, provides the sealed chamber 3 with a particularly interesting strength.

At the ends 23 of the tubular wall 2, the reinforcement ply 8 is ended by a cut or moulded edge.

The two longitudinal portions 82 each have the general shape of a rectangular strip.

These two longitudinal portions 82 join each other within the radial longitudinal lip 5. They are superimposed to each other and arranged remote from each other.

Herein, these two longitudinal portions 82 each extend:
over the whole length of the radial longitudinal lip 5 (i.e. also between its two longitudinal edges 51, 52), and
parallel, or at least approximately parallel, to each other and to the two opposite surfaces 53 of the radial longitudinal lip 5.

Taking into account this arrangement of the reinforcement ply 8, the tubular wall 2 includes two elastomeric layers 71, 72 that sandwich the main portion 81 of the reinforcement ply 8:
a continuous inner elastomeric layer 71, forming the inner surface 21 of the tubular wall 2, and
an also-continuous outer elastomeric layer 72, forming the outer surface 22 of the tubular wall 2.

The elastomeric layers 71, 72 have advantageously a thickness comprised between 0.75 and 3 mm.

The radial longitudinal lip 5 also comprises several superimposed elastomeric layers:
a single-piece and unique central portion 711, extending the inner elastomeric layer 71 and sandwiched between the two longitudinal portions 82 of the reinforcement ply 8, and
two outer portions 721, extending the outer elastomeric layer 72 and sandwiching the two longitudinal portions 82 of the reinforcement ply 8.

The central portion 711 is made integral with the inner elastomeric layer 71; the two outer portions 721 are made integral with the outer elastomeric layer 72.

Generally, the flexible tubular device 1 could also include at least one other reinforcement ply.

For example, this additional reinforcement ply could be similar to that described hereinabove and be integrated into the thickness of an elastomeric layer 71, 72 as mentioned hereinabove and/or into the radial longitudinal lip 5.

Moreover, the tubular wall 2 is equipped with a valve 6 (very schematically shown in FIG. 4), which is connected to the inner chamber 3 of the filling thereof.

This valve 6 is advantageously added in a manner conventional per se; it consists for example in a standard pass-through valve for agricultural tires.

Figure 2:
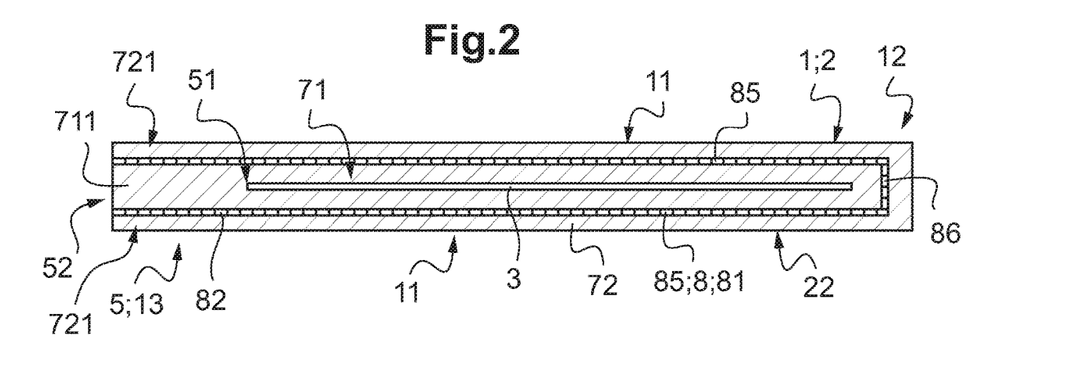
FIG. 2 schematically shows a cross-sectional view of the flexible tubular device according to FIG. 1, whose sealed chamber is empty.

FIG. 2 shows the flexible tubular device 1 in empty state (i.e. with its sealed chamber 3 without any fluid).

In this case, it is observed that this flexible tubular device 1 has the shape of a flat parallelepipedal strip, having two superimposed parallelepipedal walls 11 that are assembled (advantageously as a single and continuous piece) at the two lateral portions 12, 13, to form the sealed chamber 3.

A first lateral portion 12 (on the right in FIG. 2) has a width lower than the second lateral portion 13 (on the left in FIG. 2).

The first lateral portion 12 is hence intended to form the above-mentioned radial longitudinal rib 55; the second lateral portion 13 is intended to form the above-mentioned radial longitudinal lip 5.

The reinforcement ply 8 comprises several sections:
two main section 85 each extending over the width of one of the two parallelepipedal walls 11, and
a junction section 86 extending within the first lateral portion 12, connecting the two main sections 85.

The two main sections 85 and the junction section 86 form together the main portion 81 of the reinforcement ply 8.

Within the second lateral portion 13, the two main sections 85 extend parallel to each other and remote from each other so as to form the longitudinal portions 82 of the reinforcement ply 8.

These longitudinal portions 82 advantageously arrive along the outer edge 52 of the radial longitudinal lip 5.

When empty, this flexible tubular device 1 is particularly flat.

This aspect is particularly interesting for transportation, so as to make its transportation easier.

Device Manufacturing

The flexible tubular device 1 according to the invention may be manufactured by the assembly of a set of superimposed layers, to form an integral unit.

The technology of assembly may be chosen among vulcanization, binding or welding.

Figure 3:
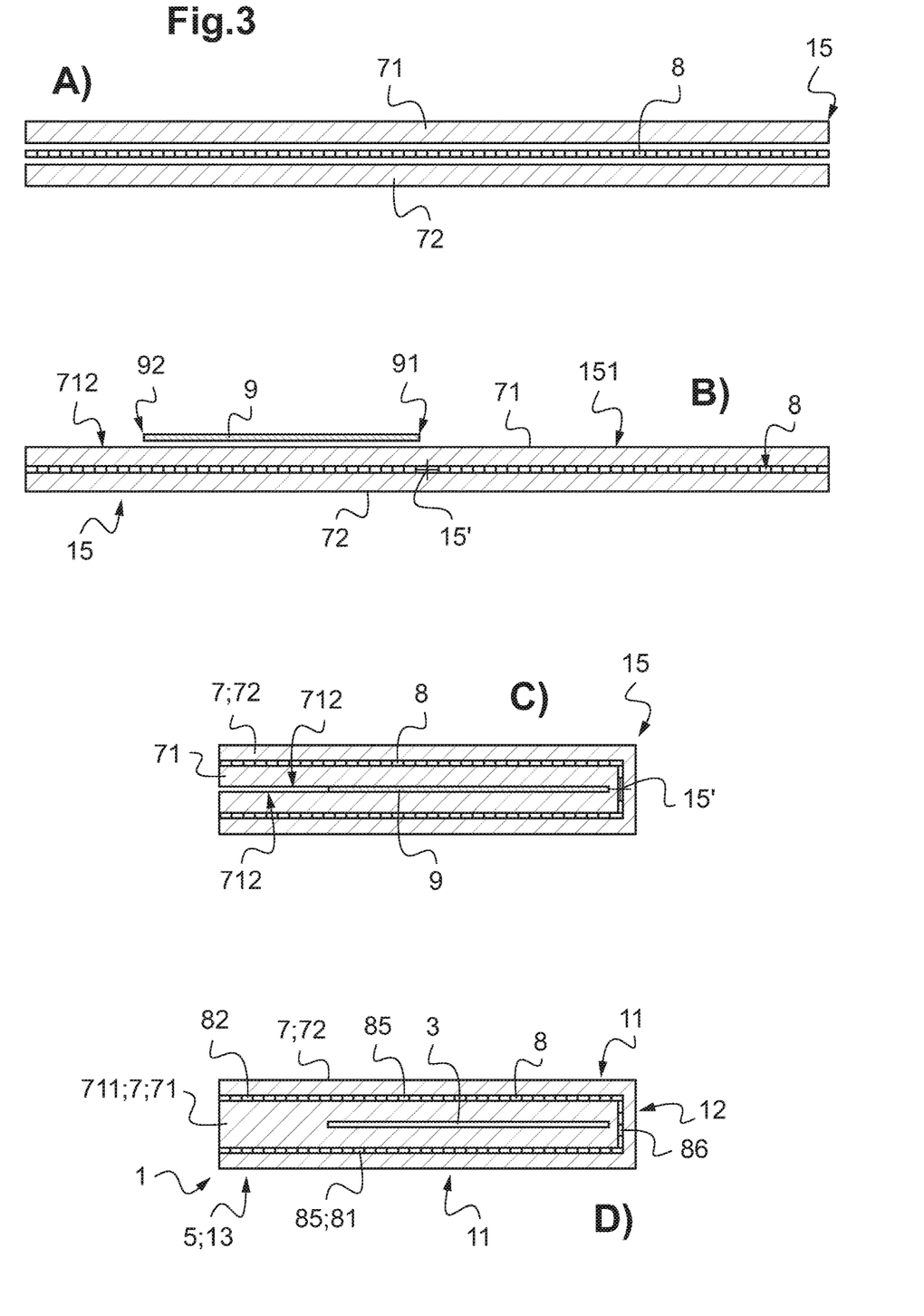
FIG. 3 is a schematic, side view of the main steps of the method for manufacturing the flexible tubular device according to FIGS. 1 and 2.

A suitable manufacturing method is described by way of example hereinafter in relation with FIG. 3.

This method comprises:
(i) a step of superimposing at least two layers of elastomeric materials 71, 72 (intended to form the above-mentioned inner 71 and outer 72 layers), between which is added the reinforcement ply 8, to form together a so-called "intermediate" strip 15 (FIG. 3A),
(ii) a step of applying inter-layer means 9 on a free surface 151 of the intermediate strip 15, adapted to locally prevent this free surface 151 from being attached, to form the sealed chamber 3 (FIG. 3B),
(iii) a step of folding in half the intermediate strip 15, along a folding line corresponding to a median longitudinal axis 15' of this intermediate strip 15, so as to sandwich the above-mentioned inter-layer means 9 with the free surface 151 (FIG. 3C), and
(iv) a step of attaching together the surfaces in contact of the free surface 151 folded over itself, to form the flexible tubular device 1 (FIG. 3D).

During the superimposition step (i), the two layers of elastomeric materials 71, 72 and the reinforcement ply 8 have advantageously identical, or at least almost identical, dimensions.

About the application step (ii), the inter-layer means 9 consist in means adapted to avoid the attachment between the opposite surfaces of the inner layer 71 folded over itself.

In the case of a vulcanization, the inter-layer means 9 consist for example in strips or tubes that are advantageously made of a material chosen among heat-resistant plastics:
a fire-barrier film containing a retardant, for example made of polypropylene, acrylonitrile-butadiene-styrene,
a layer of a vulcanized elastomeric material, for example a pipe made of styrene-butadiene rubber (SBR), natural rubber (NR) or ethylene-propylene-diene monomer.

The inter-layer means 9 have for example an elongated rectangular shape.

These inter-layer means 9 are dimensioned so as to extend, on a first longitudinal side 91, along the median longitudinal axis 15' and, on a second longitudinal side 92, remote from the juxtaposed longitudinal edge of the inner layer 71 to preserve two free strips 712 at this inner layer 71.

At the time of the attaching step (iv), the inner layer 71 is folded over itself.

The two free strips 712 in contact of this inner layer 71 will hence be attached together to form the above-mentioned central portion 711.

At the ends, the sealed chamber 3 is for example closed by upper and lower clamping devices.

Livestock Enclosure

Figure 5:
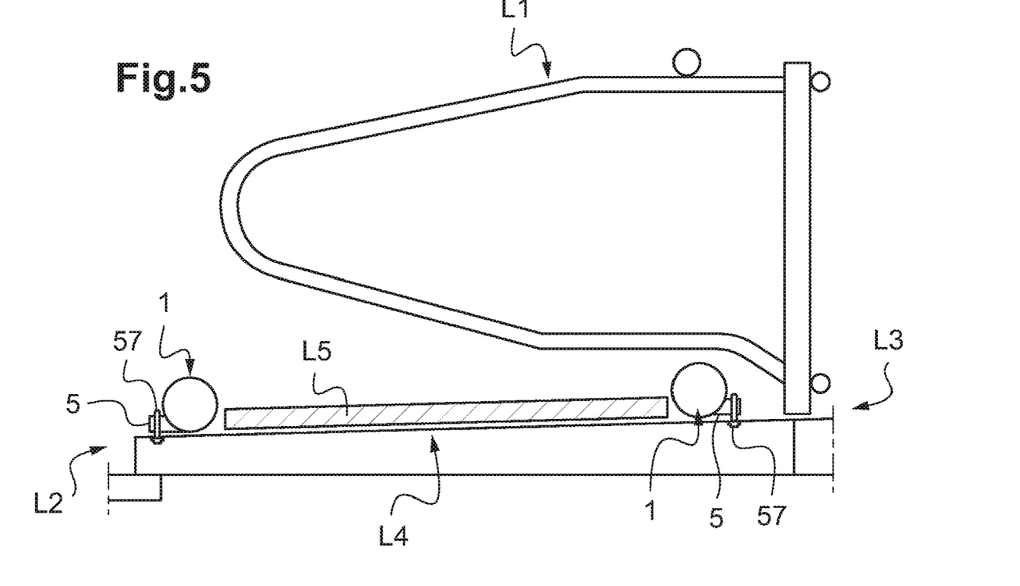
FIG. 5 is a side view of the series of stalls according to FIG. 4.

The invention also relates to a livestock enclosure E that is equipped with at least one flexible tubular device 1 (FIGS. 4 and 5).

The livestock enclosure E advantageously consists in a cowshed for cattle breeding, in particular dairy cattle or beef cattle.

This livestock enclosure E includes bedding stalls that herein consist in stalls L, arranged along at least one line.

The stalls L constitute a compromises between a comfortable bedding for the bovine, the respect of the stand-up/lie-down movement, a comfortable upright posture and a minimum stain in the stall.

Each stall L, conventional per se, is delimited by:
two lateral partitions L1, for example tubular structures,
a stall rear sill L2, extending along a access corridor,
a front limit L3, advantageously comprising an upper bar at the withers and a flexible tubular device 1 according to the invention to form a lower stop (or advance limiter), and
a ground L4, for example a concrete slab.

This series of stalls L is advantageously equipped with a comfort system L5 on which the animal is intended to stay, for example as comfort mattress.

The stop-forming flexible tubular device 1 extends along the front limit L3 of the alignment of the stalls L, and hence along the front edge of the comfort system L.

Herein, the rear sill L2 is also equipped with a flexible tubular device 1 according to the invention.

This flexible tubular device 1 hence extends along the rear sills L2 of the alignments of stalls L and along the rear edge of the comfort system L5.

The interest of this additional flexible tubular device 1 is to hold a comfort layer formed of material accumulated onto the mattress, such as dry residues from a phase separator, sand or straw.

Moreover, when the lying animal extends its leg, injuries at the back of the knees are avoided.

Each flexible tubular device 1 is fastened to the ground L4 through fastening means 57 added through its radial longitudinal lip 5.

The fastening means 57 consist for example in nails, regularly spaced apart over the length of the radial longitudinal lip 5.

These fastening means 57 pass right through the radial longitudinal lip 5, at the two opposite surfaces 53 thereof. These fastening means 57 hence pass through the two longitudinal portions 82 of the reinforcement ply 8 to provide an optimum strength.

One of the surfaces 53 of the radial longitudinal lip 5 is hence flattened against the ground L4.

The assembly of two longitudinal portions 82 of the flexible tubular device 1 is hence reinforced by the fastening means 57.

This arrangement then allows the strength of the flexible tubular device 1 to be significantly increased and hence the risk of tearing/breaking phenomena to be substantially reduced.

Each flexible tubular device 1 is moreover advantageously oriented so that its tubular wall 2 is interposed between its radial longitudinal lip 5 and the comfort system L5.

The comfort system L is hence longitudinally lined by the two flexible tubular devices 1.

The livestock enclosure E is also advantageously equipped with means 61 for filling the flexible tubular device(s) 1 (schematically shown in FIG. 4).

These filling means 61 consist for example in a source of water associated with a circulator. The water may also be stagnant, fulfilling only a role of comfort.

The filling of each flexible tubular device 1 is controlled with a manometer that is placed between this flexible tubular device 1 and the water service.

In practice, the front flexible tubular device 1, located along the front limit L3, is always filled, with higher or lower pressure according to the animals (height and stiffness adjustment).

The rear flexible tubular device 1, located along the rear sills L2, is also always full, except during cleaning operations of the stall L and the comfort system j thereof.

Indeed, this rear flexible tubular device 1 may be emptied so as to be collapsed and hence to allow the evacuation of the cleaning water towards the access corridor (by passing above the rear flexible tubular device 1, which is flattened as illustrated in FIG. 2).

The invention claimed is:

1. A livestock enclosure comprising at least one stall (L) delimited by:
   two lateral partitions (L1),
   a stall rear sill (L2), extending along an access corridor,
   a front limit (L3), forming the back of the stall (L),
   wherein said front limit (L3) includes a flexible tubular device (1) to form a lower stop, the flexible tubular device comprising a single-piece part (1) having a tubular wall (2) that delimits a sealed chamber (3) intended to be filled with a fluid,
   wherein said tubular wall (2) comprises an elastomeric matrix (7) into which is integrated at least one reinforcement ply (8) delimited by two longitudinal portions (82),
   wherein said at least one reinforcement ply (8) has the general shape of a sleeve that extends within said tubular wall (2) to surround said sealed chamber (3),
   wherein said two longitudinal portions (82) of said at least one reinforcement ply (8) are juxtaposed to each other, and
   wherein said stall rear sill (L2) is also equipped with another one of the flexible tubular device (1).

2. The livestock enclosure of claim 1,
   wherein the single-piece part (1) of the flexible tubular device (1) includes a radial longitudinal lip (5), longitudinally connected to the tubular wall (2), and
   wherein the two longitudinal portions (82) of said at least one reinforcement ply (8) are superimposed to each other within said radial longitudinal lip (5).

3. The livestock enclosure of claim 2,
wherein said elastomeric matrix (7) of the tubular wall (2) includes an inner elastomeric layer (71) and an outer elastomeric layer (72) that sandwich said at least one reinforcement ply (8), and
wherein said radial longitudinal lip (5) includes the two longitudinal portions (82) of said at least one reinforcement ply (8) that, first, sandwich a lateral portion (711) of the inner elastomeric layer (71) and, second, are sandwiched by two lateral portions (721) of the outer elastomeric layer (72).

4. The livestock enclosure of claim 1,
wherein, when empty, said flexible tubular device (1) has the shape of a parallelepipedal strip having two superimposed parallelepipedal walls (11) that delimit the sealed chamber (3) and that are assembled at two lateral portions (12, 13),
wherein said at least one reinforcement ply (8) comprises, first, two main sections (85) each extending over the width of one of the two parallelepipedal walls (11) and, second, a junction section (86) extending within a first one (12) of said lateral portions (12, 13), and
wherein said longitudinal portions (82) of said at least one reinforcement ply (8) extend within a second one (13) of said lateral portions (12, 13).

5. A livestock enclosure comprising at least one stall (L) delimited by:
two lateral partitions (L1),
a stall rear sill (L2), extending along an access corridor,
a front limit (L3), forming the back of the stall (L),
wherein said front limit (L3) includes a flexible tubular device (1) to form a lower stop, the flexible tubular device comprising a single-piece part (1) having a tubular wall (2) that delimits a sealed chamber (3) intended to be filled with a fluid,
wherein said tubular wall (2) comprises an elastomeric matrix (7) into which is integrated at least one reinforcement ply (8) delimited by two longitudinal portions (82),
wherein said at least one reinforcement ply (8) has the general shape of a sleeve that extends within said tubular wall (2) to surround said sealed chamber (3),
wherein said two longitudinal portions (82) of said at least one reinforcement ply (8) are juxtaposed to each other, and
wherein said livestock enclosure (E) comprises means (61) for filling said at least one flexible tubular device (1).

6. The livestock enclosure of claim 5,
wherein the single-piece part (1) of the flexible tubular device (1) includes a radial longitudinal lip (5), longitudinally connected to the tubular wall (2), and
wherein the two longitudinal portions (82) of said at least one reinforcement ply (8) are superimposed to each other within said radial longitudinal lip (5).

7. The livestock enclosure of claim 6,
wherein said elastomeric matrix (7) of the tubular wall (2) includes an inner elastomeric layer (71) and an outer elastomeric layer (72) that sandwich said at least one reinforcement ply (8), and
wherein said radial longitudinal lip (5) includes the two longitudinal portions (82) of said at least one reinforcement ply (8) that, first, sandwich a lateral portion (711) of the inner elastomeric layer (71) and, second, are sandwiched by two lateral portions (721) of the outer elastomeric layer (72).

8. The livestock enclosure of claim 5,
wherein, when empty, said flexible tubular device (1) has the shape of a parallelepipedal strip having two superimposed parallelepipedal walls (11) that delimit the sealed chamber (3) and that are assembled at two lateral portions (12, 13),
wherein said at least one reinforcement ply (8) comprises, first, two main sections (85) each extending over the width of one of the two parallelepipedal walls (11) and, second, a junction section (86) extending within a first one (12) of said lateral portions (12, 13), and
wherein said longitudinal portions (82) of said at least one reinforcement ply (8) extend within a second one (13) of said lateral portions (12, 13).

9. A livestock enclosure comprising at least one stall (L) delimited by:
two lateral partitions (L1),
a stall rear sill (L2), extending along an access corridor,
a front limit (L3), forming the back of the stall (L),
wherein said front limit (L3) includes a flexible tubular device (1) to form a lower stop, the flexible tubular device comprising a single-piece part (1) having a tubular wall (2) that delimits a sealed chamber (3) intended to be filled with a fluid,
wherein said tubular wall (2) comprises an elastomeric matrix (7) into which is integrated at least one reinforcement ply (8) delimited by two longitudinal portions (82),
wherein said at least one reinforcement ply (8) has the general shape of a sleeve that extends within said tubular wall (2) to surround said sealed chamber (3),
wherein said two longitudinal portions (82) of said at least one reinforcement ply (8) are juxtaposed to each other,
wherein the single-piece part (1) includes a radial longitudinal lip (5), longitudinally connected to the tubular wall (2),
wherein the two longitudinal portions (82) of said at least one reinforcement ply (8) are superimposed to each other within said radial longitudinal lip (5), and
wherein said at least one flexible tubular device (1) is fastened through fastening means (57) added through the radial longitudinal lip (5).

10. The livestock enclosure of claim 9,
wherein said elastomeric matrix (7) of the tubular wall (2) includes an inner elastomeric layer (71) and an outer elastomeric layer (72) that sandwich said at least one reinforcement ply (8), and
wherein said radial longitudinal lip (5) includes the two longitudinal portions (82) of said at least one reinforcement ply (8) that, first, sandwich a lateral portion (711) of the inner elastomeric layer (71) and, second, are sandwiched by two lateral portions (721) of the outer elastomeric layer (72).

11. The livestock enclosure of claim 9,
wherein, when empty, said flexible tubular device (1) has the shape of a parallelepipedal strip having two superimposed parallelepipedal walls (11) that delimit the sealed chamber (3) and that are assembled at two lateral portions (12, 13),
wherein said at least one reinforcement ply (8) comprises, first, two main sections (85) each extending over the width of one of the two parallelepipedal walls (11) and, second, a junction section (86) extending within a first one (12) of said lateral portions (12, 13), and wherein said longitudinal portions (82) of said at least one reinforcement ply (8) extend within a second one (13) of said lateral portions (12, 13).

\* \* \* \* \*